(12) United States Patent  (10) Patent No.: US 7,190,808 B2
Goldberg et al.  (45) Date of Patent: Mar. 13, 2007

(54) METHOD FOR WATERMARKING RECORDINGS BASED ON ATMOSPHERIC CONDITIONS

(75) Inventors: Steven Jeffrey Goldberg, Downingtown, PA (US); Richard Dan Herschaft, Whitestone, NY (US); Alain Charles Louis Briancon, Poolesville, MD (US); Prabhakar R. Chitrapu, Blue Bell, PA (US); Alan Gerald Carlton, Mineola, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 44 days.

(21) Appl. No.: 11/077,894

(22) Filed: Mar. 11, 2005

(65) Prior Publication Data

US 2005/0226461 A1  Oct. 13, 2005

Related U.S. Application Data

(60) Provisional application No. 60/633,222, filed on Dec. 3, 2004, provisional application No. 60/552,819, filed on Mar. 12, 2004.

(51) Int. Cl.
*G06K 9/00* (2006.01)
(52) U.S. Cl. .................. 382/100; 353/20; 353/29; 353/30; 386/94; 386/95; 386/96; 713/176
(58) Field of Classification Search ............... 382/100; 353/20, 29, 30; 386/94–96; 713/176
See application file for complete search history.

(56) References Cited

U.S. PATENT DOCUMENTS 5,778,304 A    7/1998  Grube et al.
5,959,717 A *  9/1999  Chaum ..................... 352/40

5,960,081 A    9/1999  Vynne et al.

(Continued)

FOREIGN PATENT DOCUMENTS

EP       0 505 266       3/1992

(Continued)

OTHER PUBLICATIONS

Mobasseri, "Exploring CDMA for Watermarking of Digital Video", Security and Watermarking of Multimedia Contents, Electronic Imaging'99, San Jose, Jan. 23-29, 1999.

(Continued)

*Primary Examiner*—Bravesh M. Mehta
*Assistant Examiner*—Patrick Edwards
(74) *Attorney, Agent, or Firm*—Volpe and Koenig, P.C.

(57) ABSTRACT

Signals encoded with watermark information are generated and broadcast into a protected area for capture by illicit recording devices along with their intended targets. An illicit recording in which at least a portion of the broadcast watermark signals are recorded is obtained and correlated with a known position of the broadcast watermark signals to yield the location of illicit recording devices. In an alternate embodiment, a surveillance device, being image and time synchronized with a signal broadcasting device, monitors and records the protected area. Illicit recordings containing the broadcast watermark are obtained and correlated with corresponding recordings taken by the surveillance device to identify the location of illicit recording devices. In an alternate embodiment, the surveillance device further monitors the quality of the broadcast watermark signals and adjusts them accordingly to achieve a desired quality level.

28 Claims, 4 Drawing Sheets

U.S. PATENT DOCUMENTS

| | | | |
|---|---|---|---|
| 6,018,374 | A | 1/2000 | Wrobleski |
| 6,266,541 | B1 | 7/2001 | Noda |
| 6,343,213 | B1 | 1/2002 | Steer et al. |
| 6,353,778 | B1 | 3/2002 | Brown |
| 6,393,254 | B1 | 5/2002 | Pousada |
| 6,529,600 | B1 | 3/2003 | Epstein et al. |
| 6,559,883 | B1 | 5/2003 | Fancher et al. |
| 6,591,096 | B2 | 7/2003 | Ezuriko |
| 6,624,874 | B2 * | 9/2003 | Revelli et al. ............... 352/90 |
| 6,625,455 | B1 | 9/2003 | Ariga |
| 6,662,023 | B1 | 12/2003 | Helle |
| 6,687,497 | B1 | 2/2004 | Parvulescu et al. |
| 6,738,572 | B2 | 5/2004 | Hunter |
| 6,771,946 | B1 | 8/2004 | Oyaski |
| 6,868,229 | B2 | 3/2005 | Balogh |
| 6,950,532 | B1 * | 9/2005 | Schumann et al. ......... 382/100 |
| 7,043,048 | B1 | 5/2006 | Ellingson |
| 2001/0031631 | A1 | 10/2001 | Pitts |
| 2002/0039896 | A1 | 4/2002 | Brown |
| 2002/0055361 | A1 | 5/2002 | McDonnell et al. |
| 2002/0057823 | A1 | 5/2002 | Sharma et al. |
| 2002/0058497 | A1 | 5/2002 | Jeong |
| 2002/0076084 | A1 | 6/2002 | Tian et al. |
| 2002/0078357 | A1 * | 6/2002 | Bruekers et al. ............ 713/176 |
| 2002/0107032 | A1 | 8/2002 | Agness et al. |
| 2002/0126871 | A1 * | 9/2002 | Hannigan et al. .......... 382/100 |
| 2002/0186845 | A1 | 12/2002 | Dutta et al. |
| 2003/0028380 | A1 * | 2/2003 | Freeland et al. ............ 704/260 |
| 2003/0078076 | A1 | 4/2003 | Kuwajima et al. |
| 2003/0112974 | A1 * | 6/2003 | Levy .......................... 380/210 |
| 2003/0122671 | A1 | 7/2003 | Jespersen |
| 2003/0133573 | A1 | 7/2003 | Himmel et al. |
| 2003/0169342 | A1 | 9/2003 | Steinberg et al. |
| 2003/0219231 | A1 | 11/2003 | Vernon |
| 2004/0005078 | A1 | 1/2004 | Tillotson |
| 2004/0029560 | A1 | 2/2004 | Ariga |
| 2004/0073803 | A1 | 4/2004 | Keramane |
| 2004/0110515 | A1 | 6/2004 | Blumberg et al. |
| 2004/0155969 | A1 | 8/2004 | Hayashi |
| 2004/0198306 | A1 | 10/2004 | Singh et al. |
| 2004/0204021 | A1 | 10/2004 | Cocita |
| 2005/0007456 | A1 | 1/2005 | Lee et al. |
| 2005/0008324 | A1 | 1/2005 | Balogh |
| 2005/0039020 | A1 | 2/2005 | Levy |
| 2005/0043548 | A1 | 2/2005 | Cates |

FOREIGN PATENT DOCUMENTS

| | | |
|---|---|---|
| EP | 0 830 046 | 3/1998 |
| EP | 1 130 500 | 9/2001 |
| EP | 1 139 684 | 10/2001 |
| EP | 1 172 270 | 1/2002 |
| EP | 1 182 901 | 2/2002 |
| EP | 1 379 098 | 1/2004 |
| EP | 1 381 234 | 1/2004 |
| EP | 1 185 923 | 3/2004 |
| EP | 1 445 923 | 8/2004 |
| EP | 1 499 148 | 1/2005 |
| GB | 211612 | 2/1927 |
| GB | 2 329 794 | 3/1999 |
| GB | 2 343 339 | 5/2000 |
| GB | 2 348 573 | 10/2000 |
| GB | 2 367 720 | 4/2002 |
| GB | 2 374 986 | 10/2002 |
| GB | 2 393 075 | 3/2004 |
| JP | 2000013497 | 1/2000 |
| JP | 2000032557 | 1/2000 |
| JP | 2000152217 | 5/2000 |
| JP | 2000165952 | 6/2000 |
| JP | 2000332890 | 11/2000 |
| JP | 2001313006 | 11/2001 |
| JP | 2002044736 | 2/2002 |
| JP | 2002125267 | 4/2002 |
| JP | 2002159059 | 5/2002 |
| JP | 2003070058 | 3/2003 |
| JP | 2003143649 | 5/2003 |
| JP | 2003219466 | 7/2003 |
| JP | 2004056769 | 2/2004 |
| JP | 2004088273 | 3/2004 |
| JP | 2004153324 | 5/2004 |
| JP | 2004242096 | 8/2004 |
| JP | 2004260631 | 9/2004 |
| JP | 2004260796 | 9/2004 |
| JP | 2005033799 | 2/2005 |
| WO | 98/34412 | 8/1998 |
| WO | 00/60556 | 10/2000 |
| WO | 02/103968 | 12/2002 |
| WO | 03/028342 | 4/2003 |
| WO | 03/040898 | 5/2003 |
| WO | 03/047207 | 6/2003 |
| WO | 2004/089021 | 10/2004 |
| WO | 2004/102313 | 11/2004 |

OTHER PUBLICATIONS

Sanzgiri et al., "A Secure Routing Protocol for Ad Hoc Networks", Proceedings of the 10th IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

* cited by examiner

METHOD FOR WATERMARKING RECORDINGS BASED ON ATMOSPHERIC CONDITIONS

CROSS REFERENCE TO RELATED APPLICATION

This application claims the benefit of U.S. Provisional Application Nos. 60/552,819, filed on Mar. 12, 2004, and 60/633,222 filed on Dec. 3, 2004, which are incorporated by reference as if fully set forth.

FIELD OF INVENTION

The present invention relates to watermarking. More particularly, the present invention is a method and apparatus for embedding a watermark into image and/or sound media for use in identifying the location and identity of illicit recorders.

BACKGROUND

Advances in technology have enabled manufacturers to miniaturize sensing components. As a result, these miniature sensing components are being embedded into many devices that previously could not house such components. Examples include wireless telephones being embedded with miniature cameras and personal digital assistants (PDAs) being embedded with miniature sound recorders.

One problem resulting from this miniaturization technology is that the physical presence of these sensing components is very difficult to detect. Even if certain devices are themselves noticeable, their miniaturized sensing components are not. As a result, devices embedded with these miniaturized sensing components are being used to record and disseminate unauthorized images and sounds (media) without the knowledge or consent of the media owners. Wireless telephones embedded with miniature cameras, for example, are used to record and transmit unauthorized images and sounds.

The present invention proposes the use of watermarking as a means for securing and regulating sensing devices and sensed media. Similar to its paper origins, watermarking in the present context is a technique for altering images or sounds so as to embed security information into them for the purposes of authenticating, tracing, and securing the recorded media. The information may be hidden or not depending on the specifics of the application. A current method for watermarking image and/or audio data (media) includes manipulating the sensed media after it has been recorded. Such watermarks are added, for example, via the recording device itself or via computer manipulation of the recorded media. This common form of watermarking is illustrated in FIG. 1A.

A sound or image (media) 102 is recorded by a recording device 104. Once the media is recorded, the recording device 104 manipulates the recorded media 102 thereby embedding a watermark into the media. After the watermark is added 105, the watermark-embedded media is stored 106 or transmitted 108.

Implementing the above described watermarking technique requires some degree of cooperation from a recording device or from its user. In other words, the recording device must be provided with additional hardware, firmware, or software which automatically embeds watermark information into recorded media or the user must voluntarily choose to embed a watermark in recorded media. It is doubtful, however, whether it is possible to universally implement such a system in which recording devices or their users are cooperative in the watermarking of unauthorized recordings. Even if such cooperation were mandated by law, the production of sensing devices that do not contain a cooperative function can still occur. Further, there are ways to defeat such safeguards even if they are included in the production of sensing devices.

An alternate method for watermarking recorded media includes embedding a watermark in the media itself prior to its being recorded. As shown in FIG. 1B, prior to being recorded by a recording device 107, a watermark 109 is embedded into sound and/or image media 103. Once recorded, the recording device 107 stores 110 or transmits 112 the watermarked media. Although no cooperation is required, embedding a watermark into the media itself tends to disturb the media's integrity.

Accordingly, it is desirable to have a method and apparatus for forcing a recording device to record a watermark along with protected media without requiring the cooperation of a recording device or its user and without having to embed the watermark into the protected media itself.

It is also noted that there does not exist an effective method or apparatus for identifying and/or locating an unauthorized recording device and/or their users engaged in the unauthorized recording of protected media. The lack of such technology is of particular concern when sensing devices are hidden and remotely activated. Without locating offending persons and/or devices, unauthorized recordings are not easily regulated, even if it is known that recording is occurring.

Accordingly, it is desirable to have a method and apparatus for identifying and locating unauthorized recording devices and/or their users engaged in the unauthorized recording of protected media.

SUMMARY

The present invention relates to a method and apparatus for embedding a watermark into image and/or sound media for use in identifying the location and identity of illicit recorders. Signals encoded with watermark information are generated and broadcast into a protected area for capture by illicit recording devices along with the intended targets of the illicit recording devices. An illicit recording in which at least a portion of the broadcast watermark signals are recorded is obtained and correlated with a known position of the broadcast watermark signals to yield the location of illicit recording devices. In an alternate embodiment, a surveillance device, being image and time synchronized with a signal broadcasting device, monitors and records the protected area. Illicit recordings containing the broadcast watermark are obtained and correlated with corresponding recordings taken by the surveillance device to identify the location of illicit recording devices and their users. In an alternate embodiment, the surveillance device further monitors the quality of the broadcast watermark signals and adjusts them accordingly to achieve a desired quality level.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, a recording device is any type of device having any type of sensing capability (i.e., sensing component(s)), including but not limited to an image sensing device, an audio sensing device, etc. A wireless transmit/receive unit (WTRU) includes but is not limited to a user equipment, mobile station, fixed or mobile subscriber unit, pager, desktop computer, laptop computer, personal digital assistant (PDA), or any other type of device capable of operating in a wireless environment. When referred to hereafter, a base station includes but is not limited to a Node-B, site controller, access point or any other type of interfacing device in a wireless environment.

In implementing the present invention, it should be understood that the various embodiments discussed below are not limited to any particular combination of sensor and another type of functional device. Thus, recording devices required to implement the present invention may be stand alone or be embedded in a functional device in any combination thereof. For example, a recording device may be a device capable of functionally making a recording only, or it may be embedded in a WTRU, which of course has additional functionality depending on the type of WTRU.

Figure 2:
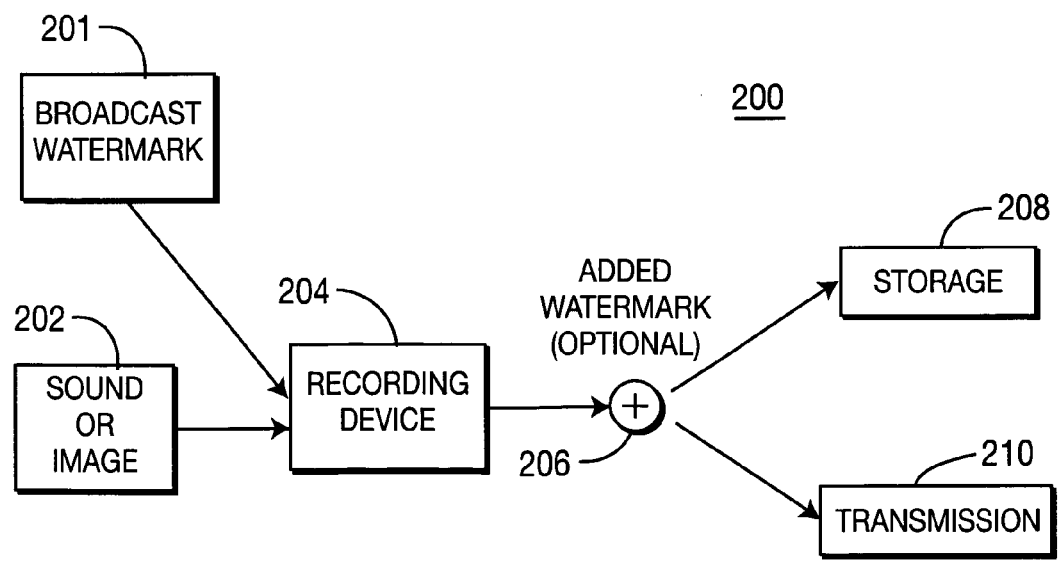
FIG. 2 shows a technique for watermarking protected media by broadcasting watermark signals into a protected area for capture by recording devices.

A feature of embodiments described below, is the broadcasting of watermark signals for capture by a recording device along with the device's intended target. This concept is illustrated in FIG. 2. As shown in the Figure, sound or image media 202 and a broadcast watermark 201 both enter a recording device 204 at the same time. That is to say, both are recorded simultaneously. Once recorded, additional watermark information 206 may optionally be added to the now watermarked media prior to its storage 208 or transmission 210. It should be noted that although the existence of the added watermark information 206 may still occur, it is not necessary.

Figure 1A:
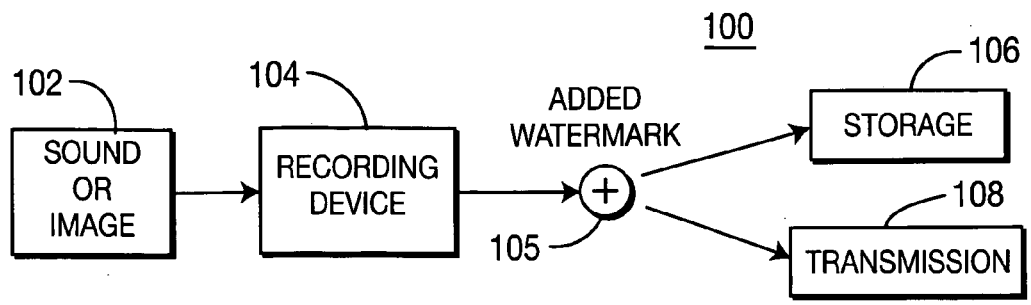
FIG. 1A shows a conventional technique for adding a watermark to image or sound media after the media has been recorded.
Figure 1B:
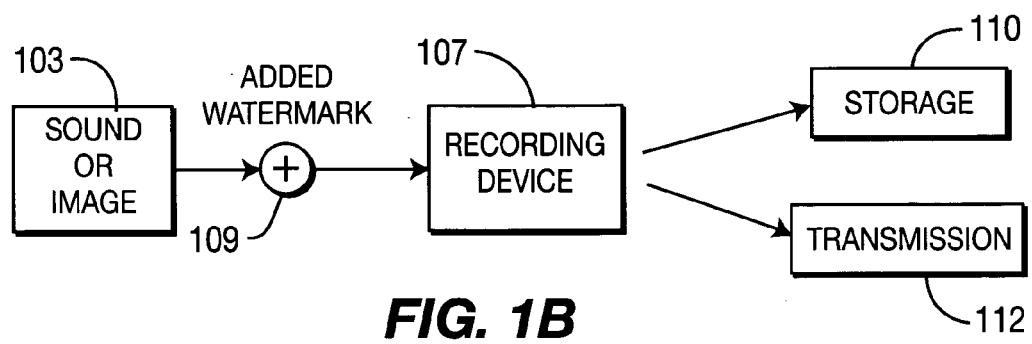
FIG. 1B shows a conventional method for watermarking recorded media by embedding a watermark in the media itself.

As previously discussed, watermark information is typically embedded into sound or image media after it is recorded (see FIG. 1A). Alternatively, watermarks are embedded in media targets such that recording the target also results in recording the watermark (see FIG. 1B). The so called "after-added" watermarks require some degree of cooperation, either with an intended target, or with a recording device. Media embedded watermarks disturb the integrity of the media itself. As discussed below, broadcast watermark signals in accordance with the present invention require no such cooperation nor do they disturb the integrity of protected media targets.

Although many of the embodiments discussed below are described with reference to image media and/or image marking signals, it should be understood that the present invention is not limited to image media. All embodiments of the present invention are equally applicable to sound media, multi-media, and any other form of media or any combination thereof.

In a preferred embodiment, signals encoded with watermark information are generated and broadcast into a protected area. These watermark signals are broadcast such that if an illicit recording device/user (hereinafter, recorder) attempts to record sound or image media in the protected area, the recorder will also record the broadcast watermark signal. Illicit recordings containing these watermark signals are then utilized to identify the illicit recorder. The recorded watermark signals are extracted from illicit recordings and correlated with the known position of the broadcast watermark signal to identify the position of the illicit recorder.

The watermark signals described hereinafter are preferably light signals generated in the electromagnetic spectrum or sound signals generated in certain frequency ranges. In deployments where it is desirable for the watermark signals to be noticeable, the signals are broadcast at high light and/or sound levels in frequency bands within normal human perception. If however, the watermarks signals are intended to be inconspicuous, they may be broadcast at low levels and in frequency bands that are not obviously noticeable to humans, yet detectable by sensing components in a recording device.

The watermark signals of the present embodiment are preferably encoded with some form of time and location indication information. It should be noted, however, that the signals may be encoded with any information deemed useful in locating the position of an illicit recorder. Examples of other such useful information include date stamps, particular location information, image or sound information, and the like. To improve the efficiency of these watermark signals, bar codes rather than text may be used to encode the information.

Watermark signals encoded with the type of information that varies over time, such as for instance a time stamp, are preferably broadcast with both the old and the updated information simultaneously during an overlapping time interval. This simultaneous encoding assures that at all times, at least one form of the encoded information remains stable, i.e., is not being updated at the exact time that the signal is being recorded.

For deployments in which it is desirable to broadcast watermark signals encoded with advanced and/or significant amounts of information, such as with multi-media, two distinct watermark signals are preferably generated. One of these signals is encoded with basic information, such as basic time and location information, for capture by those devices incapable of recording more advanced watermarks. The second signal is encoded with the additional or advanced information for capture by more advanced recorders. Generating these two types of watermark signals assures the watermarking of all recordings taken in a protected area, even those taken with non-sophisticated recording devices.

Figure 3:
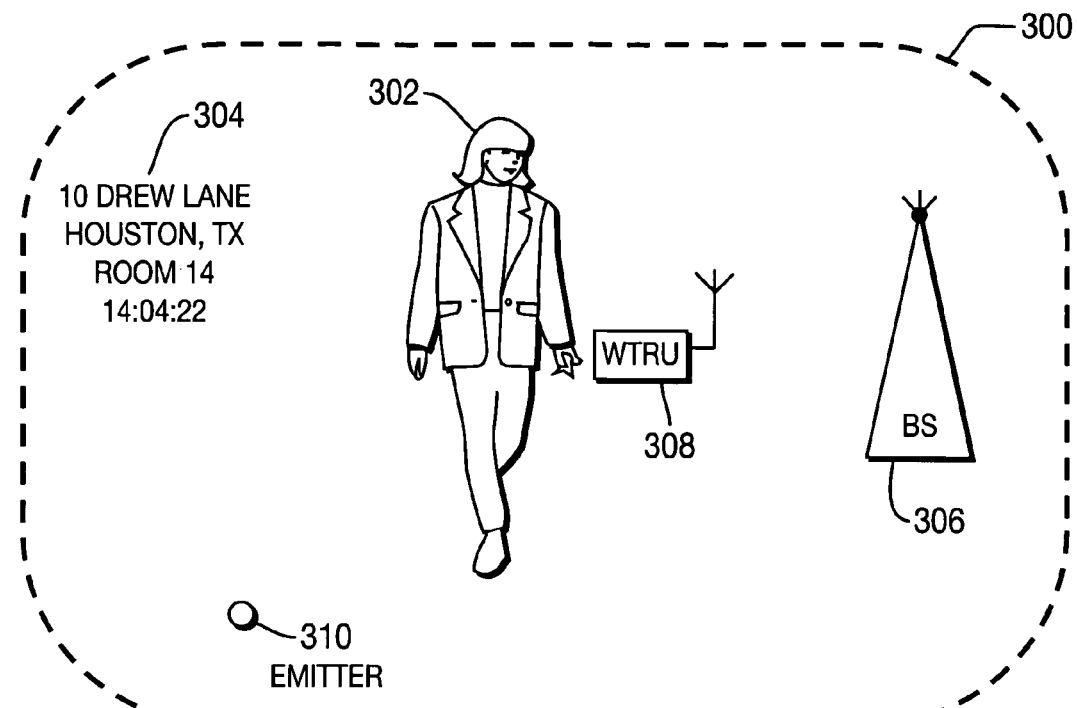
FIG. 3 illustrates an embodiment of the present invention wherein a watermark signal is broadcast into a protected area for capture by a recording device.

An implementation example of the present embodiment is shown in FIG. 3. A person 302 is shown in a protected area 300. A watermark broadcasting device generates and broadcasts a watermark signal 304 into the protected area 300. The broadcasting device may be any type of device capable of broadcasting a watermark signal 301 into a protected area 300. For example, the broadcasting device may be a base station 306, a WTRU 308 (which may or may not be operated by person 302), an emitter 310 configured to broadcast watermark signals, etc.

As shown in FIG. 3, the watermark signal 304 is encoded with location information and a time mark. Any attempt to record this person 302 results in the simultaneous recording of the person 302 and the broadcast watermark 304.

Figure 4:
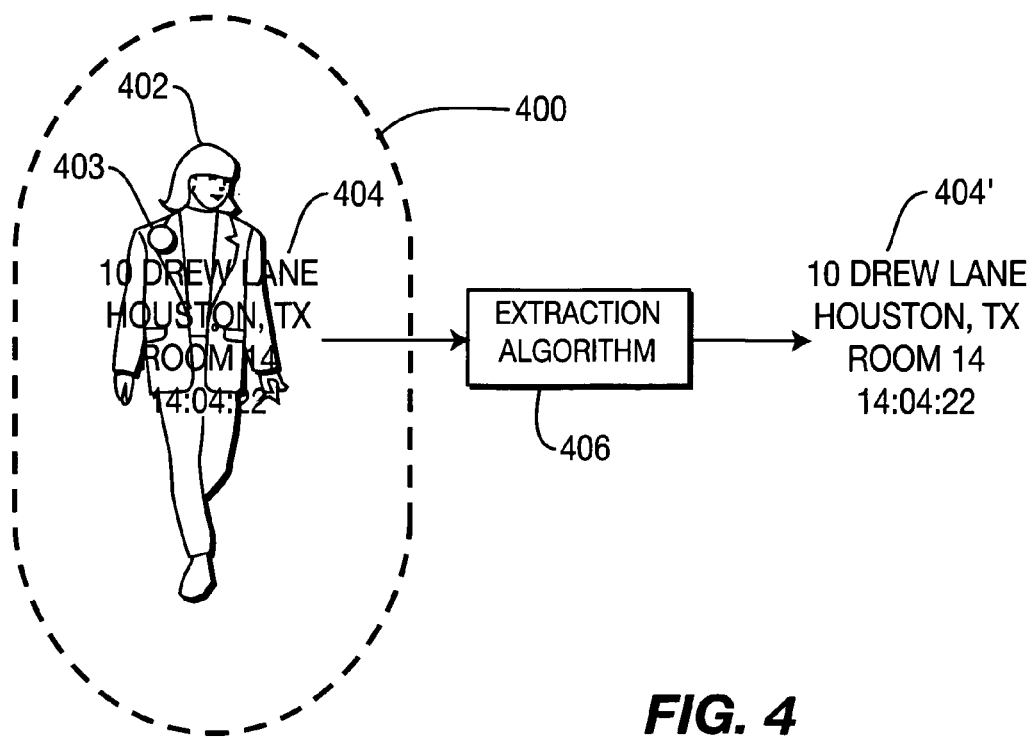
FIG. 4 illustrates a mobile device being utilized to broadcast a watermark signal into a protected area for capture by a recording device.

Another implementation of the present embodiment is illustrated in FIG. 4, wherein a mobile watermark broadcasting device is used to generate and broadcast a watermark signal in accordance with the present embodiment. In protected area 400, a person 402 is shown wearing a mobile watermark broadcasting device 403. This mobile device 403 generates and broadcasts a watermark signal 404. It should be understood that a base station may alternatively generate and encode the watermark signals and then transmit these to the device 403 for broadcasting.

As in FIG. 3, the signal 404 is encoded with detailed location information and a time mark. In the present example, however, the watermark signal 404 is broadcast directly in front of a protected target, i.e., the person 402. As a result, the signal may be somewhat distorted. In order to comprehend the watermark signal 404, if necessary, it may be extracted from a recording of the person 402 using an extraction algorithm 406. The resultant watermark 404' is clear and comprehensible. To aid in the watermark extraction process, a recording of the watermark signal itself can be specially encoded so as to allow for the easy extraction of the watermark signal.

The protected areas of FIGS. 3 and 4 (300, 400) are rather open and empty areas. Empty areas provide optimal conditions for broadcasting watermark signals. In reality, however, most protected areas will not be empty. In fact, most protected areas will have many obstructions in them preventing the unimpeded broadcast of watermark signals. Even people moving through protected areas tend to obstruct and interfere with the broadcast of watermark signals.

Figure 5:
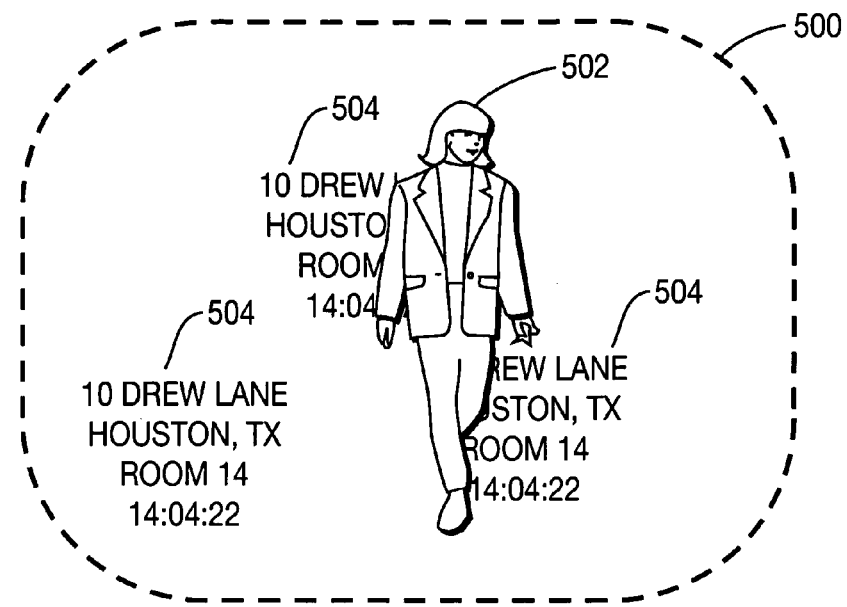
FIG. 5 illustrates an embodiment of the present invention wherein a broadcast watermark signal is redundantly broadcast into a protected area for capture by a recording device.

In order to overcome such obstructions, watermark signals may be redundantly broadcast throughout the protected area. This implementation of the present embodiment is shown in FIG. 5. Protected area 500 is shown wherein a person 502 is located. A watermark broadcasting device (not shown) is positioned behind the person 502 while a recording device (not shown) is positioned in front of the person 502. As a result, portions of the watermark signals 504 are obstructed from view of the recording device (not shown). Since the watermark signals 504 were redundantly broadcast, however, many portions of the broadcast signals are not obstructed. These non-obstructed portions may be combined to form a substantial portion of the broadcast signal 502.

Alternatively or in addition to redundantly broadcasting the watermark signals 504 in protected area 500, the signals 504 may be spread across wide areas. As with redundant broadcasting, unobstructed portions of the spread watermark signals can be recovered and combined to form a substantial portion of the watermark signal.

In an alternate embodiment, light emissions associated with illuminating a protected area are used to watermark recorded images. By manipulating light emissions used to illuminate a desired area at their point of generation, or by filtering such emissions before they are broadcast, a user can control the lighting characteristics of the illumination. These characteristics include the frequency or combination of frequencies at which these light emissions are broadcast. In the present embodiment, a user manipulates and/or filters illuminating light emissions in a predetermined manner so as to encode these emissions with watermark information. Optionally, additional light or near light frequencies, such as infrared and ultraviolet, can be generated for broadcast into the protected area along with the light emissions. The resulting frequency combinations, along with the relative power levels at which the emissions and/or additional light signals are broadcast contain the encoded information.

In an alternate implementation of the present embodiment, various light sources are positioned throughout the protected area in a predetermined manner. The combination of frequencies, amplitudes, and phase distances at which these light sources broadcast the light emissions encode the watermark information. To assist in recovering the watermark information from a recording, the light emissions may be redundantly encoded such that the encoded watermark information may be extracted using standard error correction techniques, such as forward error correction coding. In addition, these light emissions may be spread spectrum transmitted throughout the protected area such that the watermark information may be recovered even if large portions of the information is missing or was incorrectly decoded.

In an alternate embodiment, a surveillance device is utilized to create a surveillance network to further assist in ascertaining the identity of an illicit recorder. This surveillance network comprises a surveillance device for monitoring and providing recordings of a protected area, including recordings of potentially illicit recorders; a broadcasting device, which is preferably image and time associated with the surveillance device for broadcasting encoded signals into the protected area; and a processor configured to process information into watermark signals. The processor is a stand alone device or may be incorporated into the surveillance device or the broadcaster. Although the present embodiment may include a single surveillance device, it is preferable to have multiple surveillance devices, each strategically located throughout the protected area to ensure the proper monitoring and recording of the protected area and potentially illicit recorders.

As in previous embodiments, signals are generated and broadcast into a protected area. These signals are encoded with time data, and are preferably further encoded with location identifying information. The location information may include, for instance, the direction in which the signals are being broadcast. To illustrate, watermark signals broadcast in the southerly direction may be encoded to indicate their southerly broadcast direction. Similarly, signals broadcast in the easterly direction may be encoded to indicate their easterly broadcast direction. Thus, recordings taken in the southerly direction of the protected area will capture the southerly encoded watermark signals; and recordings taken in the south-eastern direction will capture two watermark signals, a southerly encoded signal and an easterly encoded signal.

A signal-broadcasting device broadcasts these encoded or 'watermark' signals into the protected area to be recorded along with any intended targets. Illicit recordings taken in the protected area are analyzed and processed to extract watermark signals. Extracted location identifying information is correlated with the known position of the broadcasting device to identify the position of the illicit recorder. This position information, along with time marks extracted from the illicit recordings, are further correlated with recordings provided by the surveillance device to yield a surveillance recording of the recorder engaging in illicit recording activities. From this recording, the identity of the illicit recorder is determined.

If in the present embodiment, location information is unavailable for broadcast as part of the watermark signals, or is broadcast but is not readable, visual and/or audio reference 'clues' may be distributed throughout the protected area to provide an alternate form of location identifying information. For instance, if location information is unavailable for broadcast as part of image marking signals, static objects with known coordinates may be distributed throughout a protected area. The known location of these static objects would then be used along with extracted time mark information to identify an illicit recorder as discussed above.

Figure 6:
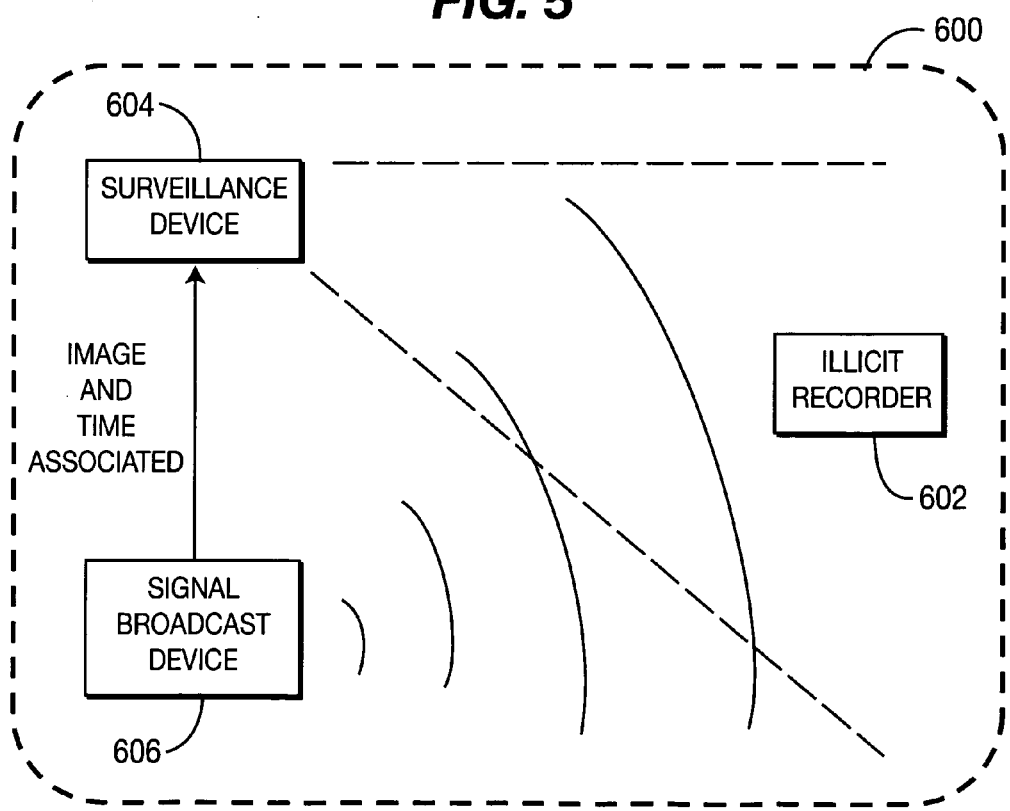
FIG. 6 is a surveillance network wherein watermark signals are broadcast into a protected area for capture by a recording device and wherein a surveillance device is utilized to record the recording device engaging in recording activities.

A surveillance network for implementing the above-described present embodiment is shown in FIG. 6. In a protected area 600, a broadcasting device 606 configured to emit watermark signals encoded with time and optional location indication information is deployed. The location information includes directional data indicating the direction in which the watermark signals are being broadcast. A surveillance device 604 (e.g., security video recorder), being image and time associated with the broadcasting device 606, monitors and records the protected area 600. When an illicit recorder 602 records sound and/or image data in the protected area 600, it also records the encoded watermark signals. Simultaneously, the surveillance device 604 records the illicit recorder engaging in its illicit recording activities.

An illicit recording (not shown) taken in area 600 is obtained and the recorded watermark signal is extracted. Location identifying information extracted from the watermarked recording is correlated with the known position of the broadcasting device 606 to identify the position of the illicit recorder 602. The position of the recorder 602 along with time marks extracted from the illicit recording (not shown) are then correlated with recordings provided from the surveillance device 604 to yield a surveillance recording of the recorder 602 engaging in illicit recording activities. From this recording, the identity of the illicit recorder is determined.

Regarding the relative locations of the surveillance device and the signal broadcasting device of the present embodiment, it is preferable that the two are collocated. If however, the surveillance device is not collocated with the broadcasting device, utilizing GPS-type information, the surveillance device can manipulate its recordings such that the recordings are similar to recordings that would be perceived if the surveillance device were collocated with the broadcasting device.

Figure 7:
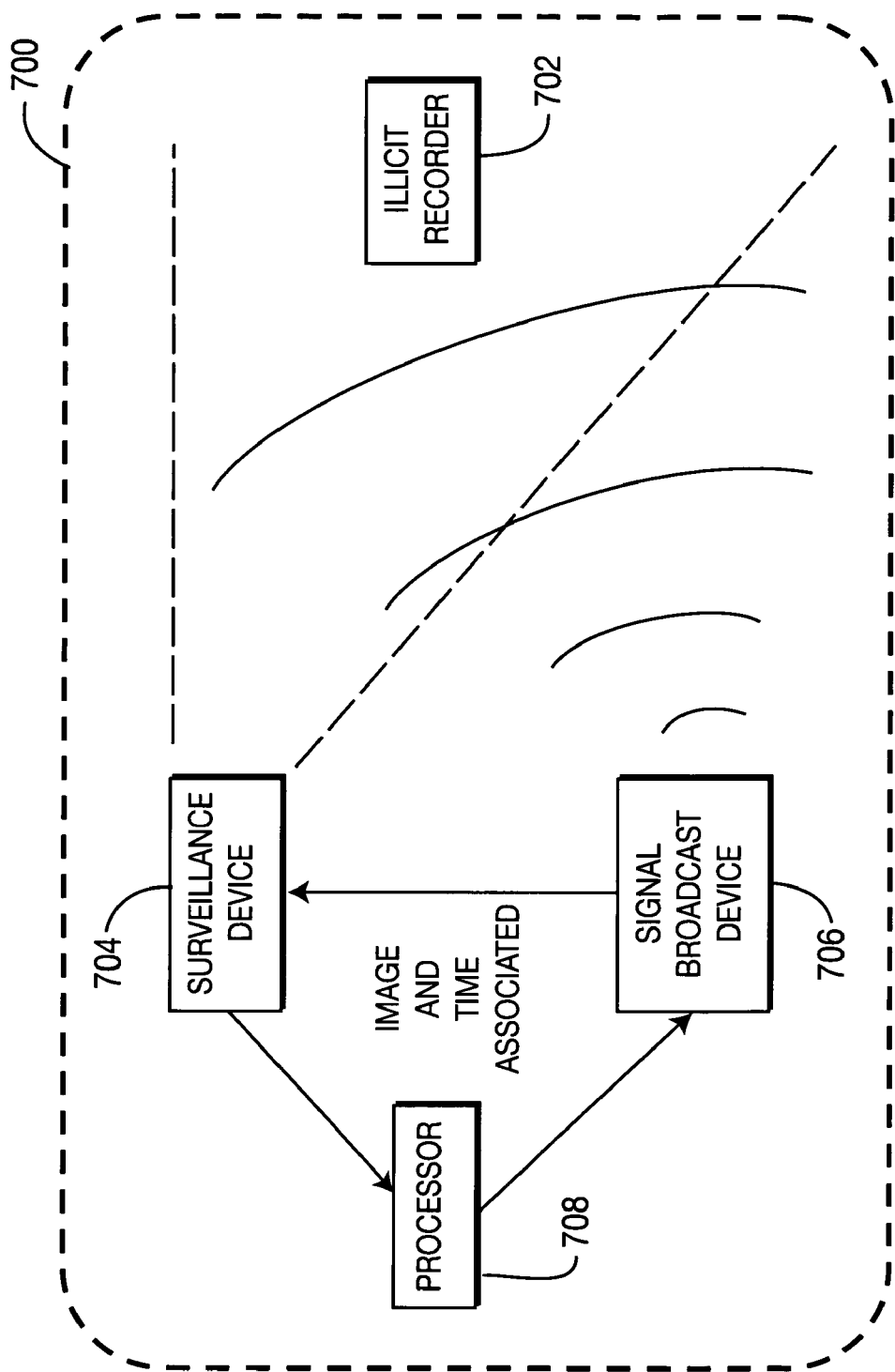
FIG. 7 is a surveillance network for encoding surveillance recordings for broadcasting as watermark signals.

In an alternate embodiment, the surveillance network described in the previous embodiment is utilized to encode surveillance recordings for broadcast as watermark signals. This concept is described with reference to FIG. 7. In a protected area 700, a surveillance device 704, being image and time associated with a signal broadcasting device 706, monitors and records the protected area 700. A processor 708 configured to receive and encode surveillance recordings is shown having a wired or wireless connection to both the surveillance device 704 and the broadcasting device 706. Although the processor 708 is depicted as being a stand alone device, it should be understood that the processor 708 may be incorporated into the surveillance device 704 or the signal broadcasting device 706.

The processor 708, rather than generating time and location encoded signals, encodes surveillance recordings received from the surveillance device 704 as watermark signals. These encoded signals are transferred to the broadcasting device 706 for broadcast into the protected area 700. Recordings taken in protected area 700 by illicit recorder 702 will not only include their intended targets, but also the encoded surveillance recordings in the form of a watermark on the intended target. As a result, the identity of illicit recorders can be ascertained directly from illicit recordings. There is no need to extract and correlate the watermark information with known reference data.

If, in the present embodiment, the surveillance encoded watermark is unrecognizable, it may be correlated with original surveillance recordings to identify the best match, and thus identify the illicit recorder. As previously stated, time and/or location information does not have to be encoded and broadcast as part of the watermark signal. However, inclusion of such information facilitates correlating unrecognizable surveillance watermarks with the original surveillance recordings.

In certain deployments, broadcasting real-time surveillance recordings encoded as watermarks may not be optimal. For example, if a motion picture recorder is recording real time surveillance images, it is unlikely that the watermark will be intelligible. Since each recorded frame will capture a different surveillance watermark, multiple frames can not be combined to compose a clear watermark image. In such cases, the surveillance-encoded watermarks may be broadcast for an extended period of time, i.e., in non-real time. In other words, each image taken by the surveillance camera is broadcast back into the area for a longer time period than would be a normal recording rate for a recording device.

In any of the previously described embodiments, user identified data may be encoded into the broadcast watermark signals for constant inclusion or for context specific inclusion. Such data may be entered into the broadcasting device via a keypad, a voice recognition device, an I/O connection from another device such as a WTRU or a personal digital assistant (PDA), or any other appropriate device. In addition, connection to a network allows for a wide range of control and interrogation of watermark devices. For example, data to be encoded as watermark information may be remotely entered into a signal broadcasting device; or in the case of a surveillance network, a user may remotely instruct the surveillance device to record at low rates during periods of low occupation.

In an implementation of any of the embodiments described herein that utilizes a surveillance device, watermark information is preferably not broadcast into a protected area. Instead, reference points in illicit recordings are used to correlate with surveillance recordings.

In another embodiment, watermark signals are generated and maintained so as to have a desired level of quality. Quality in regard to image/audio encoded watermarks will be discussed in terms of 'fidelity' and 'robustness'. It should be understood, however, that any user defined quality metric may be utilized without departing from the scope of the present embodiment. For purposes of this embodiment, fidelity will be defined as the perceptual similarity between an original scene and the scene with a broadcast watermark. A watermark may disturb a scene as perceived by people viewing the scene first-hand, or disturb a scene as viewed on a recording; and robustness as the ability to detect the watermark signal after common signal processing. In addition to fidelity and robustness, there is another dimension of quality known as "information-inclusion". Information inclusion involves the selection of items of metadata and the number and quality of images that are included in a watermark. Robustness, fidelity, and information-inclusion all involve aspects of bandwidth and interrelate based on priorities. However, in evaluating the quality level of a watermark, a surveillance device, for example, can only evaluate the resulting robustness and fidelity, but not information-inclusion.

In this embodiment, images and/or sounds of a protected area are recorded using a surveillance device. Recordings of the protected area with and without the broadcast watermark may be evaluated for similarity to determine a quality level of a particular watermark. Where the quality is below a predetermined level, appropriate adjustments may be made. For example, if it is determined that a broadcast watermark has errors, then in an iterative manner, the strength or intensity of the broadcast watermark may be increased at the expense of fidelity. Similarly, where necessary, robustness may be increased at the expense of fidelity. If an extracted watermark is changing over time, the surveillance device can adjust the information rate such that each data symbol more clearly represents each encoded bit.

It is understood that a recording of a protected area taken for purposes of generating a watermark or monitoring an area may not be perceived the same by an illicit recorder. For example, if the protected area is highly reflective, then image/audio data sensed by an illicit recorder may be different than image/audio data sensed for purposes of watermark generation and/or monitoring. In such a scenario, pilot signals may be emitted into the protected area as a means for determining the reflectivity of the various portions of the protected area. These pilot signals are preferably in frequency bands that are outside of those perceivable by humans.

The atmosphere in the protected area may also alter the perception of an illicit recorder differently than it alters the perception of a surveillance device. In such a scenario, the light/audio distorting properties of the atmosphere may be estimated by sending probing signals, such as light rays, sonar, radar, and the like into atmosphere of the protected area. This atmospheric information can be utilized along with estimates of illicit recorders to predict noise that may be perceived by illicit recorders.

For mobile targets, the broadcasting device of the present embodiment is preferably a mobile device attached to the targets. For example, if the protected 'area' was a person, a watermark broadcasting device in accordance with the present embodiment can be embedded in a miniature device attached to the target's belt buckle, lapel, or other appropriate location on the person. In such a deployment, the watermark signal would be broadcast onto the person himself.

In an alternate implementation of the present embodiment, a broadcast watermark can be projected onto a mist screen in front of a mobile or stationary protected area. This implementation is similar to the concept behind rear projection televisions in that the source of the broadcast watermark is relatively small, however, when broadcast onto a screen, the signal is enlarged. The mist screen described herein may consist of fine vapor drawn from the surrounding atmosphere utilizing dehumidifying functionality. In such a deployment, due to necessity, a surveillance device may be positioned between intended targets in the protected area and the vapor screen such that it may layer the vapor screen image on top of an image of the protected area in order when extracting the watermark.

In order to compensate for potential differences in perception between a surveillance device and an illicit recorder, the surveillance device is preferably configured with an 'understanding' of the refraction of light through a water droplet in order to transform the reflected image seen by the surveillance device into a refracted image. In this regard, a mist screen consisting of more than a fine vapor with light projection may also be utilized to obfuscate the image of a subject.

As in all previously described embodiments, user generated metadata that is useful in identifying the location, time, identity, etc. of an illicit recorder may be encoded in the broadcast watermark signals. This metadata may be entered into the watermark encoding/broadcasting device for constant or context specific inclusion in generated watermarks. Such data may be entered into the encoding/broadcasting device via a keypad, a voice recognition device, an I/O connection from another device such as a cellular phone or a personal digital assistant (PDA), or any other appropriate device. In addition, connection to a network allows for a wide range of control and interrogation of watermark devices. Location data may be entered directly by a user or it can be generated by GPS functionality within the device or elsewhere. All entered or generated metadata may be encrypted.

Although the elements in the Figures are illustrated as separate elements, these elements may be implemented on a single integrated circuit (IC), such as an application specific integrated circuit (ASIC), multiple ICs, discrete components, or a combination of discrete components and IC(s). Although the features and elements of the present invention are described in the preferred embodiments in particular combinations, each feature or element can be used alone without the other features and elements of the preferred embodiments or in various combinations with or without other features and elements of the present invention. Furthermore, the present invention may be implemented in any type of wireless communication system.

What is claimed is:

1. A method for locating a recorder in a protected area, the method comprising:
    (a) generating a signal encoded with watermark information;
    (b) broadcasting the watermark signal into a protected area;
    (c) obtaining a recording in which at least a portion of the broadcast watermark signal is recorded; and
    (d) correlating the recorded portion of the watermark signal with a known position of the broadcast watermark signal; wherein the watermark signal is based on a desired quality level and the atmospheric conditions.

2. The method of claim 1 wherein step (b) further comprises broadcasting a watermark signal that is difficult to distinguish from noise by humans.

3. The method of claim 1 wherein step (b) further comprises broadcasting the watermark signal in front of a protected target using a mobile device attached to the target, said watermark signal being extractable from a recording of said target using an extraction algorithm.

4. The method of claim 1 wherein step (b) further comprises redundantly broadcasting the watermark signal throughout the protected area such that a recording of said protected area includes a plurality of non-obstructed portions of the broadcast watermark signal, said plurality of signal portions being selectively combined to determine said watermark information.

5. The method of claim 1 wherein step (b) further comprises redundantly spreading the broadcast watermark signal across a wide area in the protected area using high redundancy coding such that said watermark information is extractable from a recording of said protected area via an error correction technique.

6. The method of claim 1 wherein step (a) further comprises encoding the watermark signal with current time, date, and location information.

7. The method of claim 1 wherein step (b) further comprises updating by simultaneously broadcasting a watermark signal encoded with updated watermark information and a watermark signal encoded with previously current watermark information.

8. The method of claim 1 wherein step (a) further comprises encoding the watermark signal with bar coded information.

9. The method of claim 1 wherein step (b) further comprises using time reversal audio to broadcast audio watermark signals.

10. The method of claim 1 wherein electromagnetic signals are encoded with watermark information and broadcast into a protected area such that a recording of said protected area includes a combination of watermark signals, said signals being broadcast from a plurality of sources positioned throughout the protected area.

11. The method of claim 10 wherein the signals are generated in a light frequency band.

12. The method of claim 10 wherein the signals are generated in an ultraviolet or infrared frequency band.

13. The method of claim 10 wherein the signals are encoded with watermark information by varying the frequencies of said signals in a predetermined manner.

14. The method of claim 10 wherein the signals are encoded with watermark information by varying the amplitude of said signals in a predetermined manner.

15. The method of claim 10 wherein the signals are encoded with watermark information by varying the phase distance between said signals in a predetermined manner.

16. The method of claim 10 wherein the signals are redundancy encoded with watermark information such that said watermark information is extractable from a recording of said protected area via an error correction technique.

17. The method of claim 10 wherein the signals are broadcast across a wide area in the protected area using high redundancy coding such that said watermark information is extractable from a recording of said protected area via an error correction technique.

18. The method of claim 1 wherein step (a) further comprises:
(a1) generating a fundamental watermark signal encoded with basic watermark information; and
(a2) generating an advanced watermark signal encoded with advanced watermark information, said advanced information being detectable by recording devices with advanced recording functionality; and wherein step (b) further comprises broadcasting fundamental and advanced watermark signals into a protected area.

19. A method for broadcasting a watermark into a protected area, the method comprising:
(a) sensing atmospheric conditions in a protected area;
(b) generating a watermark signal having a desired quality level based on the atmospheric conditions;
(c) broadcasting the watermark signal into the protected area;
(d) monitoring the quality level of the broadcast watermark signal; and
(e) adjusting the watermark signal to maintain the desired quality level.

20. The method of claim 19 wherein the watermark signals are electromagnetic signals encoded by varying a combination of the signals' frequencies, amplitudes, and phase distances.

21. The method of claim 19 wherein the watermark signals are audio signals encoded by varying a combination of the signals' frequencies, amplitudes, and phase distances.

22. The method of claim 19 wherein the quality level of the watermark signal is defined in terms of fidelity and robustness.

23. The method of claim 19 further comprising:
(d1) extracting the broadcast watermark signal from the protected area;
(e1) iteratively increasing the robustness of the watermark signal if the extracted watermark signal has errors; and
(e2) iteratively decreasing the robustness of the watermark signal if the extracted watermark is without errors.

24. The method of claim 19 wherein step (a) further comprises:
(a1) broadcasting probing signals into the protected area to determine the atmospheric conditions in the protected area.

25. The method of claim 19 wherein the watermark is broadcast by a signal broadcasting device operated by a protected target.

26. The method of claim 19 wherein step (c) further comprises:
(c1) broadcasting the watermark signal onto a vapor screen in front of the protected area.

27. The method of claim 19 wherein the watermark signal is encoded with metadata, said metadata being entered into a processor for encoding via a keypad, a voice recognition device, an input/output connection, or remotely through a wireless network.

28. The method of claim 27 wherein the metadata is encrypted.

* * * * *